(12) United States Patent
Lang et al.

(10) Patent No.: US 6,813,490 B1
(45) Date of Patent: Nov. 2, 2004

(54) MOBILE STATION WITH AUDIO SIGNAL ADAPTATION TO HEARING CHARACTERISTICS OF THE USER

(75) Inventors: Heikki Lang, Kirjala (FI); Satu Jääskcläincn, Piispanristi (FI); Scppo Karjalainen, Turku (FI); Olli Aaltoncn, Turku (FI); Terho Kaikuranta, Piispanristi (FI); Petri Vuori, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/466,713

(22) Filed: Dec. 17, 1999

(51) Int. Cl.[7] .............................................. H04Q 7/20
(52) U.S. Cl. ................. 455/414.1; 455/575; 455/90.1; 379/406; 379/411; 381/317; 381/318; 204/221
(58) Field of Search ........................... 455/569, 575, 455/550, 450, 414, 512, 522, 552, 553, 38.3, 403, 525.1, 90.1; 379/52, 310, 343, 347, 406, 411, 457; 381/56, 66, 23.1, 68.2, 68.4, 94, 101–103; 704/221–222, 271

(56) References Cited

U.S. PATENT DOCUMENTS

| | | | | |
|---|---|---|---|---|
| 4,051,331 A | * | 9/1977 | Strong et al. | 381/320 |
| 4,817,155 A | * | 3/1989 | Briar et al. | 704/203 |
| 5,195,132 A | | 3/1993 | Bowker et al. | |
| 5,203,027 A | | 4/1993 | Nounin et al. | |
| 5,231,648 A | | 7/1993 | Driedger et al. | |
| 5,276,739 A | * | 1/1994 | Krokstad et al. | 381/318 |
| 5,285,480 A | | 2/1994 | Chennakeshu et al. | |
| 5,291,519 A | | 3/1994 | Tsurumaru | |
| 5,297,169 A | | 3/1994 | Backstrom et al. | |
| 5,388,185 A | * | 2/1995 | Terry et al. | 379/346 |
| 5,394,475 A | | 2/1995 | Ribic | 381/68.2 |
| 5,537,673 A | | 7/1996 | Nagashima et al. | |
| 5,539,806 A | * | 7/1996 | Allen et al. | 379/52 |
| 5,559,855 A | * | 9/1996 | Bowens et al. | 379/52 |
| 5,737,389 A | * | 4/1998 | Allen | 379/1 |
| 5,737,719 A | * | 4/1998 | Terry | 704/209 |
| 5,745,583 A | | 4/1998 | Koizumi et al. | |
| 5,751,820 A | * | 5/1998 | Taenzer | 381/68 |
| 5,768,397 A | | 6/1998 | Fazio | 381/68 |
| 5,771,299 A | * | 6/1998 | Melanson | 381/312 |
| 5,960,346 A | * | 9/1999 | Holshouser | 455/436 |
| 5,966,639 A | * | 10/1999 | Goldberg et al. | 455/11.1 |
| 6,009,311 A | * | 12/1999 | Killion et al. | 455/63 |
| 6,061,431 A | * | 5/2000 | Knappe et al. | 379/52 |
| 6,064,893 A | * | 5/2000 | O'Brien | 455/569 |
| 6,085,078 A | | 7/2000 | Stamegna | |
| 6,112,103 A | * | 8/2000 | Puthuff | 455/557 |
| 6,122,500 A | * | 9/2000 | Dent et al. | 455/414 |
| 6,198,830 B1 | * | 3/2001 | Holube et al. | 381/321 |
| 6,212,496 B1 | * | 4/2001 | Campbell et al. | 704/221 |
| 6,253,172 B1 | * | 6/2001 | Ding et al. | 704/219 |
| 6,345,251 B1 | * | 2/2002 | Jansson et al. | 379/88.01 |
| 6,353,671 B1 | * | 3/2002 | Kandel et al. | 381/312 |
| 6,674,868 B1 | * | 1/2004 | Narusawa | 381/317 |

FOREIGN PATENT DOCUMENTS

WO     WO 99/14986     3/1999

* cited by examiner

*Primary Examiner*—Pablo N. Tran (57) ABSTRACT

A method and apparatus for increasing the intelligibility of speech signals received by mobile stations via adapting some of the acoustic parameters of speech in the frequency domain. The mobile station may have the capability to modify speech signal parameters to conform the speech signal to a listener's hearing profile. In an alternative embodiment, mobile station processing and battery power are conserved by the communication network having the capability to modify speech signal parameters to conform the speech signal to a listener's hearing profile. To conserve mobile station memory, the user's hearing profile may be stored on the network.

19 Claims, 6 Drawing Sheets

MOBILE STATION WITH AUDIO SIGNAL ADAPTATION TO HEARING CHARACTERISTICS OF THE USER

FIELD OF THE INVENTION

This invention relates to audio signal compensation techniques and, more particularly, to mobile communication devices with audio signal adaptation for hearing characteristics of the listener.

BACKGROUND

As people age, hearing ability often deteriorates. A common type of age-related hearing problem is reduced sensitivity of the ear to the higher end of the speech frequency range. For the elderly with this type of hearing loss, following a conversation is difficult. This problem is exacerbated when using a telephone because there is no visual feedback, unlike that present in face to face conversation. In fact, most listeners are not able to discriminate speech solely by hearing if the listener's formant discrimination ability is less than half a normal listener's. Formant discrimination is the ability to distinguish the sounds (formants) that compose a particular speech sound.

Speech signals consist of different kinds of acoustic cues covering the frequency range of 0.1 kHz to 8 kHz. This frequency range is within the normal hearing sensitivity curve, which is often described as the speech banana due to the shape of the curve. All the acoustic cues in speech (e.g., fundamental frequency, vowel formants, noise bursts, transitions, etc.) lie within the speech banana. The most important part of the banana is the middle region, approximately 0.5 kHz to 2 kHz. This middle region carries most of the phonetically important information in speech. For example, the higher (over 3 kHz) formants in vowels can be destroyed largely without any significant effects on the intelligibility of speech signals. If, however, formants in the middle range are destroyed or covered by noise, the intelligibility of a speech signal is seriously decreased.

Unfortunately, mobile communication systems have generally not recognized the problems caused by destruction of formant information in the middle region of the speech banana. Often, due to the destruction of middle region formants, it is hard for even a listener with normal hearing to understand spoken messages via a telephone. Listeners with hearing loss are at an even greater disadvantage because the visual cues that they commonly use to compensate are not present in phone conversations.

Many people have high frequency hearing loss. These people generally have lost some ability to hear the upper end of the middle region of the speech banana. The most usual reason for not being able to discriminate higher frequencies in speech is decreased hearing ability caused by aging (presbyacusis) or noise injury. Because female voices are generally higher in frequency than male voices, it is commonly difficult for older listeners to understand female voices.

Hearing defects caused by presbyacusis or noise injury are quite common. Presbyacusis of varying degrees develops in everyone as they age. Familiar sources of noise injury that may cause permanent hearing damage in the speech frequencies are jet engines, rock concerts, and industrial equipment.

Often, users of mobile communication systems are forced to communicate by speech in environments where background noise of high or low frequencies selectively masks important information in their speech. This background noise interference will reduce the hearing capability of even a person having normal hearing ability. Because telephone conversations decrease the intelligibility of speech even in listeners with normal hearing, presbyacusis and noise injury further worsen the quality of speech intelligibility in telecommunications.

SUMMARY OF THE INVENTION

Disclosed is a method and apparatus for increasing the intelligibility of speech in mobile communications. Transposing some of the acoustic information bearing parameters of speech in the frequency domain modifies a speech signal so that intelligibility can be increased for listeners suffering from presbyacusis, noise injury, or other hearing impairments.

To compensate for presbyacusis, noise injury, high background noise, or other causes of hearing impairment, the critical frequencies in the speech signal can be shifted in the frequency domain in such a way that the information bearing elements of the speech signal remain unchanged in relation to each other. For example, to compensate for a listener's presbyacusis, the shifting of speech signal information is towards lower frequencies in a manner that all or a part of the speech range is moved to a frequency band that is more suitable for the listener.

In a presently preferred embodiment of the invention, a mobile station is disclosed that processes a received audio signal such that acoustic cues important to speech intelligibility are transposed in the frequency domain to account for a listener's unique hearing ability or to compensate for background noise. The mobile station may use a predetermined hearing profile for the listener, perhaps obtained from listener's audiologist, may create a listener profile by administering a hearing test, may allow the user to select a profile from a menu of predetermined profiles, or may allow the user to create his own profile by entering information via the user interface. In alternative embodiments, background noise either in the speaker's environment or in the listener's environment may be counteracted by shifting the voice signal away from the frequencies of the background noise. In another alternative embodiment, the mobile communications network could perform all the signal processing necessary to implement the disclosed innovations, thereby saving mobile station battery and processing power. In some embodiments, user profiles could also be stored on the communication network in order to save mobile station memory and to allow users to freely switch between mobile stations without having to recreate a listener profile.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
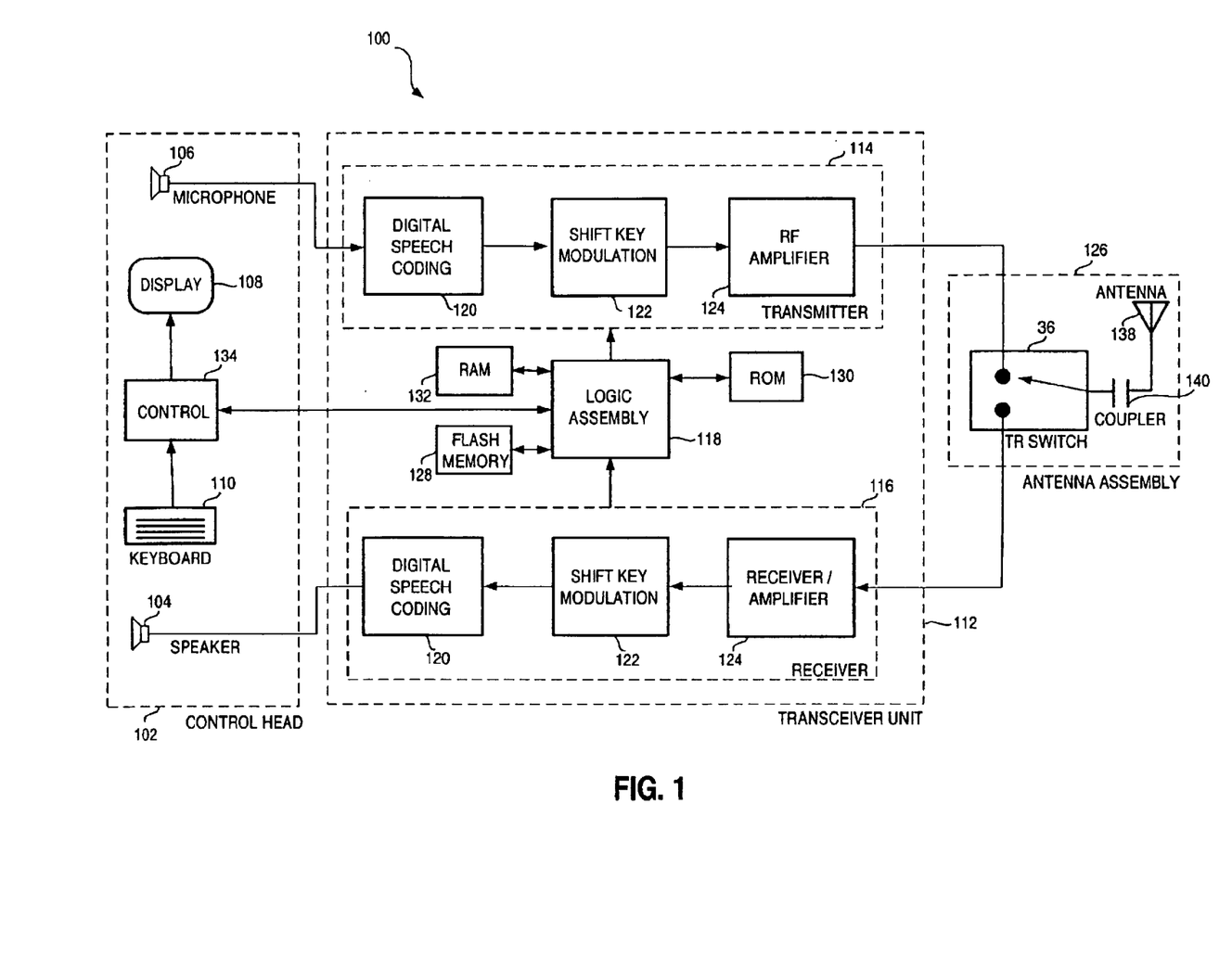
FIG. 1 depicts a block diagram of a mobile station that may implement an embodiment of the disclosed innovations.

Various embodiments of the disclosed method and system will be described using a mobile station. FIG. 1 shows a mobile station 100 capable of implementing the disclosed innovations. The mobile station 100 includes, in this example:

A control head 102 containing an audio interface, i.e. a speaker 104 and microphone 106. The control head 102 generally includes a display assembly 108 allowing a user to see dialed digits, stored information, messages, calling status information, including signal strength, etc. The control head generally includes a keypad 110, or other user control device, allowing a user to dial numbers, answer incoming calls, enter stored information, and perform other mobile station functions. For embodiments of the invention that are able to create user profiles, for example by administering hearing tests, a listener may use the keypad 110 to mark when the listener has heard a tone during the test. The control head also has a controller unit 134 that interfaces with a logic control assembly 118 responsible, from the control unit perspective, for receiving commands from the keypad 110 or other control devices, and providing status information, alerts, and other information to the display assembly 108;

A transceiver unit 112 includes a transmitter unit 114, receiver unit 116, and the logic control assembly 118. The transmitter unit 114 converts low-level audio signals from the microphone 106 to digital coding using a codec (data coder/decoder) 120. The digitally encoded audio is represented by modulated shifts, for example, in the frequency domain, using a shift key modulator/demodulator 122. Other data received from the logic control assembly 118, such as station parameters and control information, may also be encoded for transmission. The modulated signal is then amplified by RF amplifier 124 and transmitted via an antenna assembly 126.

In some embodiments of the invention, logic control assembly 118 may compensate for background noise in the speaker's or listener's environment. This can be accomplished by, among other methods, using microphone 106 in control head 102 to sense background noise during periods where no speech activity is occurring. Thus the background noise level and/or frequency can be sampled by mobile station 100 during this sampling period between speech activity. During the periods when speech activity is occurring, the speech signal can be modified to shift the speech signal away from the background noise in the frequency domain based upon knowledge of the background noise obtained during the sampling period. To compensate for background noise in the speaker's environment, a speech signal may be modified in logic control assembly 118 before transmission by RF amplifier 124. To compensate for background noise in the listener's environment, a speech signal may be modified in logic control assembly 118 before it is acoustically reproduced in speaker 104.

The antenna assembly 126 contains a TR (transmitter/receiver) switch 136 to prevent simultaneous reception and transmission of a signal by the mobile station 100. The transceiver unit 112 is connected to the antenna assembly 126 through the TR switch 136. The antenna assembly contains at least one antenna 138 coupled to TR switch 136 by coupler 140.

A receiver unit 116 receives a transmitted signal via the antenna assembly 126. The signal is amplified by receiver/amplifier 124 and demodulated by shift-key demodulator 122. If the signal is an audio signal, it is decoded using the codec 120. The audio signal is then reproduced by the speaker 104. Other signals are handled by the logic control assembly 118 after demodulation by demodulator 122.

A logic control assembly 118 usually containing an application specific integrated circuit (ASIC) combining many functions, such as a general-purpose microprocessor, digital signal processor, and other functions, may be implemented in one integrated circuit. The logic control assembly 118 coordinates the overall operation of the transmitter and receiver using control messages. Various disclosed embodiments make use of the logic control assembly 118 to control processing of a speech signal to increase intelligibility of the speech signal. Generally, the logic control assembly 118 operates from a program that is stored, for example, in flash memory 128 of the mobile station. The program stored in flash memory 128 may implement any or all of the inventive methods disclosed below. Flash memory 128 allows upgrading of operating software, software correction, or addition of new features. Flash memory 128 may also be used to hold user information such as speed dialing names, stored numbers, and, in the context of the disclosed invention, a user's hearing profile. The various disclosed embodiments typically function from this or another section of the mobile station's memory.

In addition to flash memory 128, the mobile station will typically contain read only memory (ROM) 130 for storing information that should not change, such as startup procedures, and random access memory (RAM) 132 to hold temporary information such as channel number and system identifier.

Figure 2:
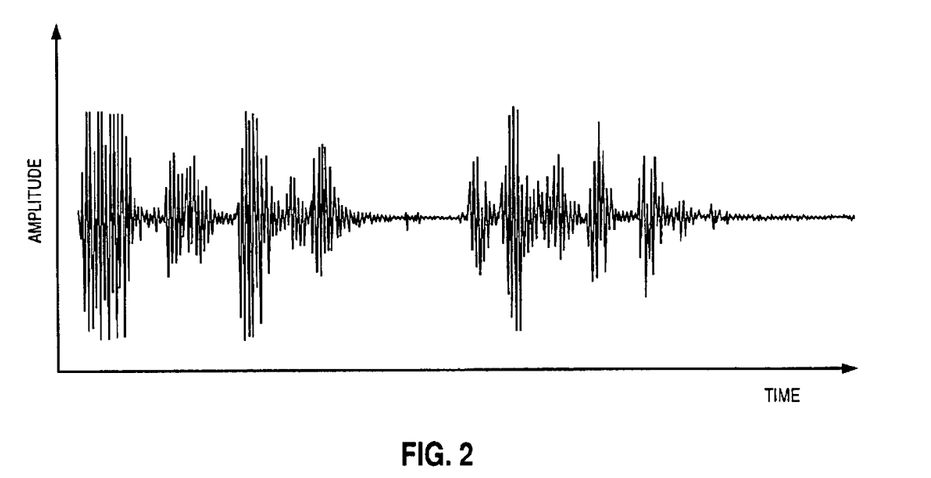
FIG. 2 depicts a speech sample with characteristic signal in the time domain.

FIG. 2 shows a typical example of a voice signal with its characteristic signal in the time domain. Such a voice signal is unintelligible to a significant portion of listeners due to hearing loss or background interference. By transposing some of the acoustic cues in this signal in the frequency domain, the disclosed invention can increase the signal's intelligibility to many listeners.

Figure 3:
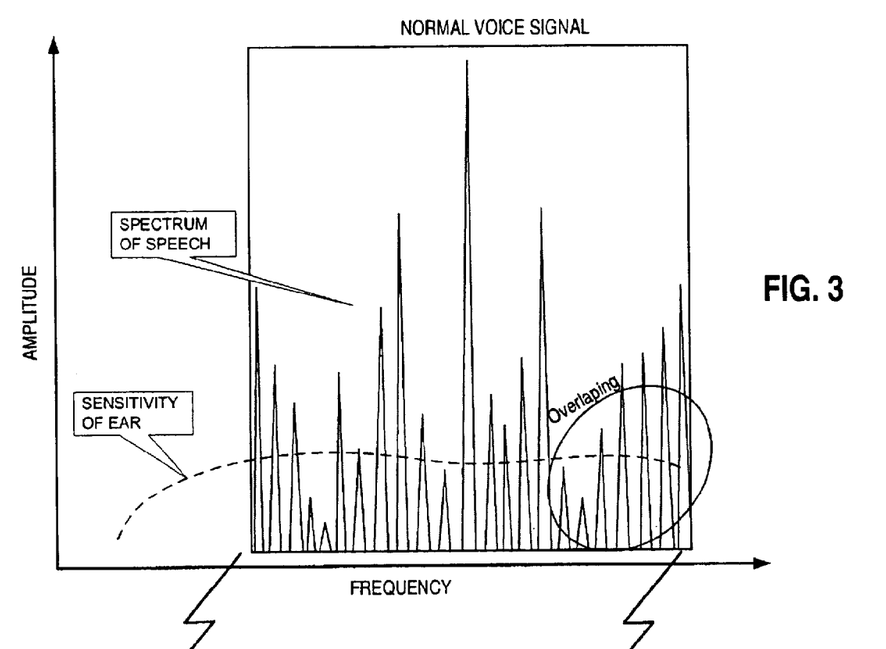
FIG. 3 compares an unmodified voice signal with a typical hearing sensitivity curve of a young person.

FIG. 3 shows an enlarged picture of an unmodified portion of the speech signal in the frequency domain and its relation to the hearing sensitivity curve (speech banana) of a typical young person with normal hearing. The high-end frequencies of the speech signal and the high frequency end of the hearing sensitivity curve overlap. Thus this listener can hear all the acoustic cues in this speech signal. Note that in this example, there is unused spectrum available at the lower end of the hearing sensitivity curve. In some embodiments of the disclosed invention, the voice signal can be moved into this previously unused spectrum.

Figure 4:
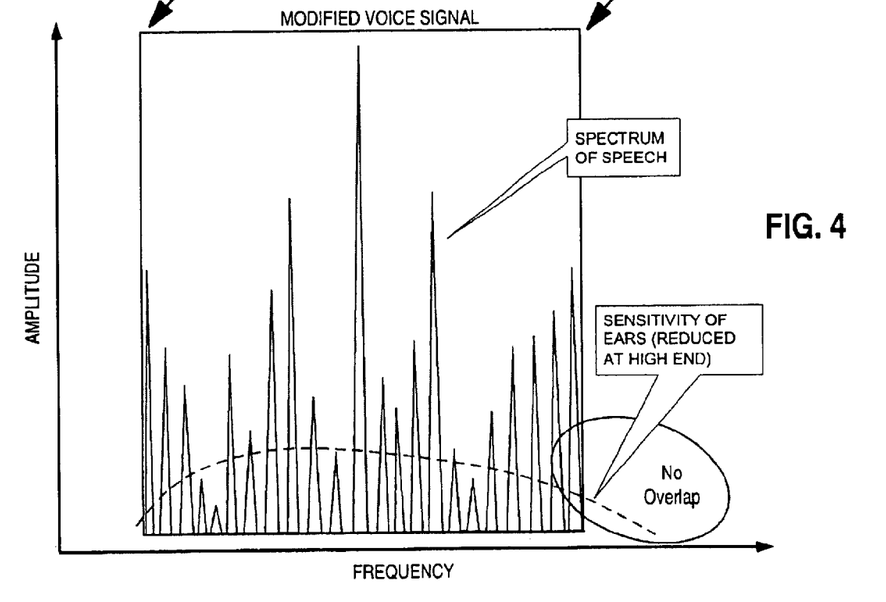
FIG. 4 compares an unmodified voice signal with a typical hearing sensitivity curve of an older person with reduced high frequency sensitivity.

FIG. 4 shows an enlarged picture of a transposed portion of the voice signal in the frequency domain. This example shows a hearing sensitivity curve with reduced high-end sensitivity, in other words a hearing impairment at high frequencies. If the voice signal is not transposed, this reduced sensitivity causes speech to be less intelligible due to lost acoustic cues. As shown, the spectrum of the voice signal is moved to lower frequencies to adapt the signal to the listener's unique hearing ability. Thus there is little overlap of the frequencies where the listener has impaired hearing and the frequencies where the voice signal has been transposed.

The voice signal shown in FIG. 4 is not merely shifted in frequency by the preferred embodiments of the disclosed invention. Such a frequency shift, without more, will distort acoustic cues necessary for understanding speech.

Figure 5:
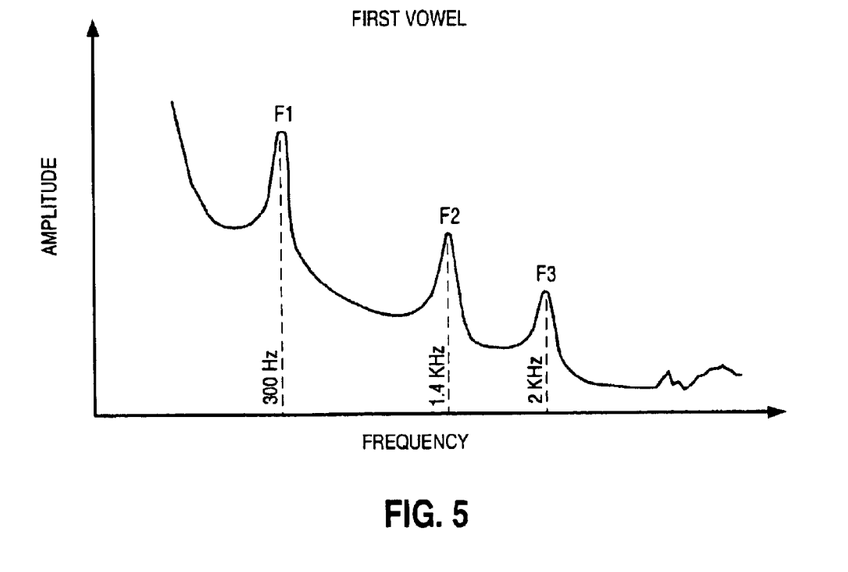
FIG. 5 depicts the frequency and amplitude characteristics of a first vowel.
Figure 6:
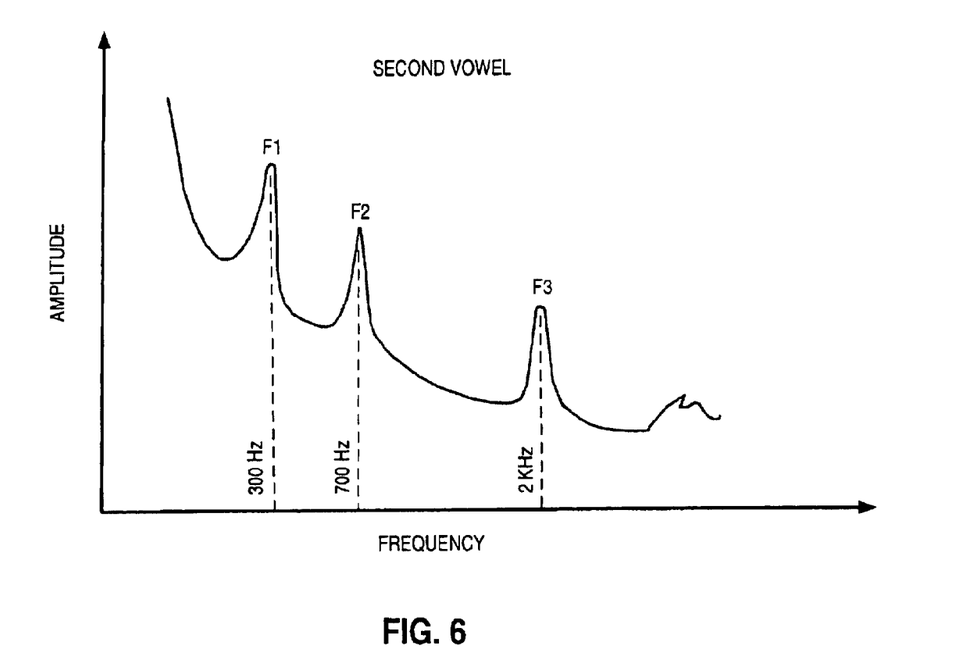
FIG. 6 depicts the frequency and amplitude characteristics of a second vowel.

FIG. 5 shows a first vowel sound and the relationship between formants, F1, F2 and F3 that distinguish this vowel sound from others. FIG. 6 shows a second vowel sound and the relationship between its formants. By comparing FIG. 5 to FIG. 6, it can be seen that formant F1 and F3 are located at the same frequency. Formant F2 is at a different frequency location. The distinguishing difference between these two vowel sounds, from a speech intelligibility viewpoint, is not the frequency location of formant F2. The distinguishing difference is the relative relationship between the locations of the formants. In other words, one of the relationships that distinguishes the first vowel sound from the second is that in the first vowel sound (as shown in FIG. 5) formant F2 occurs at a frequency roughly five times as great as the frequency at which formant F1 occurs and in the second vowel sound (as shown in FIG. 6) formant F2 occurs at a frequency that is roughly twice as great as the frequency at which formant F1 occurs. This relationship between formants is why the vowel sounds are perceived as different sounds by the listener and why the preferred embodiments of the disclosed invention do not merely shift the frequency of the voice signal.

One acoustic cue necessary for understanding speech is the relative relationship between formants. The listener uses this relationship to distinguish the different sounds from which speech is composed. As an example, if the vowel sound of FIG. 6 was uniformly shifted downward by 200 Hz, the relationship between formants F1 and F2 would be damaged, resulting in a less intelligible vowel sound. The shift would cause F1 to occur at 100 Hz (the lower end of the normal hearing sensitivity curve) and F2 would occur at 500 Hz. The frequency shift has caused formant F2 to occur at a frequency that is five times the frequency at which formant F1 occurs. In other words, merely shifting the frequency of the second vowel sound may cause the second vowel sound shown in FIG. 6 to have the formant relationship of the first vowel sound shown in FIG. 5, thus causing the second vowel sound to be confusingly similar to the first vowel sound.

The preferred methods of implementing the disclosed inventions will retain the relative distances or positions of the formants F1, F2, and F3. Although a vowel sound, for example, may have many formants, it is currently believed that the relationship between the first three is most important to speech intelligibility. Referring to FIG. 1, in the preferred embodiment logic assembly 118 processes the voice signal such that the relative position between the first three formants will remain essentially unchanged.

Shifting the frequency spectrum of a part of the voice signal may be accomplished in at least two ways. In the first way, the transposed signal is overlaid on top of whatever acoustic signal may already be in the frequency band to which the transposed signal is shifted. While conceptually easy, this first method has the disadvantage that special processing may be required to avoid doubling the noise in the overlapping areas. This special signal processing generally has undesirable effects on the speech signal. In the second way, the transposed signal replaces whatever signal was originally present in the frequency band to which the transposed signal is shifted. The second method avoids doubling the noise due to the overlapping signals but will lose whatever information was originally in the band.

Figure 7:
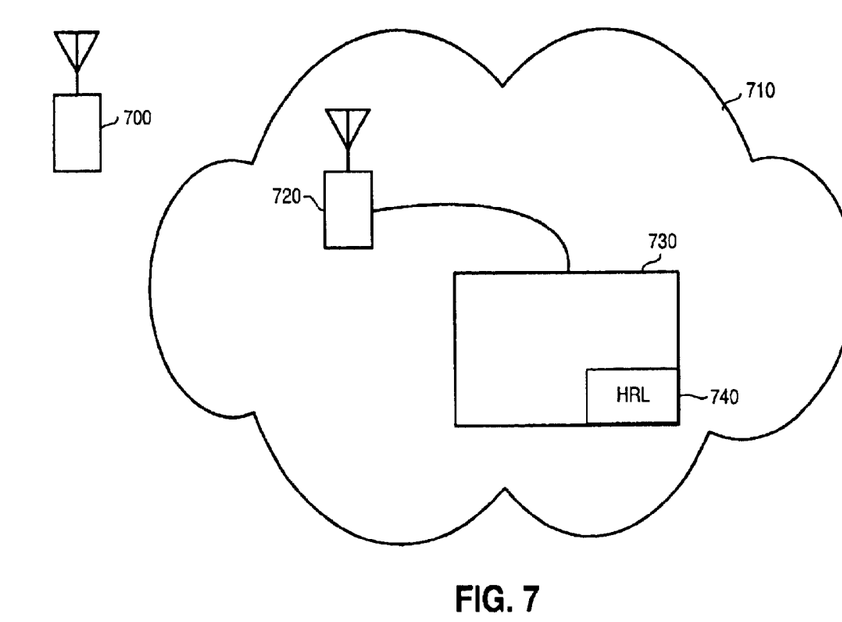
FIG. 7 depicts a block diagram of a typical communication system that may implement an embodiment of the disclosed innovations.

FIG. 7 depicts a mobile station 700 and a communications network 710 capable of implementing the disclosed innovations in an alternative embodiment. Communications network 710 would typically consist of at least a base station (BS) 720, mobile switching center (MSC) 730 and Home Location Register (HLR) 740. In this alternative embodiment, some or all of the signal processing necessary to adapt a voice signal to a listener's hearing characteristics would take place in the network 710. By performing signal processing of the voice signal, network elements such as the base station 720 or mobile switching center 730 can free the mobile station 700 from this computational burden and conserve its battery power.

When mobile switching center 730 registers with the network 710, MSC 730 would first locate a hearing profile for the user of mobile station 700. This profile could be stored with the rest of the mobile station's information in the HLR 740 or in the mobile station 700 itself. If no profile is found, mobile station 700 or a network element such as MSC 730 via mobile station 700 could query whether the user desires to create a hearing profile. If so, either the mobile station 700 or the network elements via the mobile station could administer a hearing test by playing tones of varying loudness for the user. The user would, perhaps, press a key on the mobile station keypad or speak into the mobile station microphone when the tone is loud enough to be heard. In this way, a hearing profile that tracks the unique hearing sensitivity curve of the user could be created. Alternatively, via the keypad or voice input, the user could select a preset hearing profile from a menu of a predetermined profiles, enter settings for his own unique profile, or could download a profile, perhaps from his audiologist.

When mobile switching center 730 receives a voice signal destined for mobile station 700, a signal processor in MSC 730 would process the voice signal by one of the disclosed methods to enhance intelligibility for the listener in accordance with the listener's hearing profile.

Figure 8:
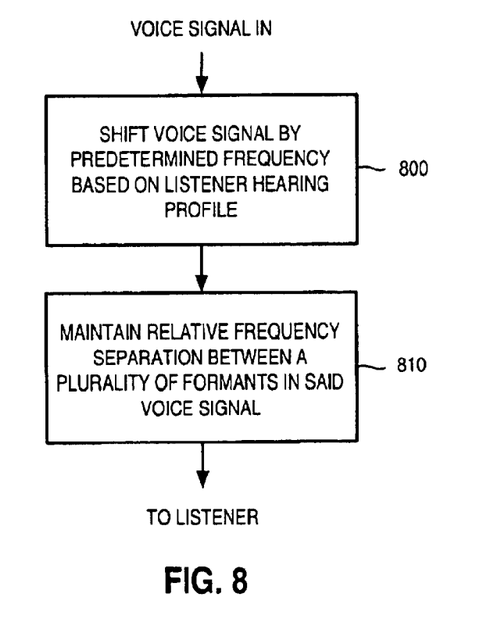
FIG. 8 depicts a block diagram of a method of implementing an embodiment of the invention.

FIG. 8 depicts a block diagram of a method of implementing an embodiment of the invention. In step 800, a voice signal is shifted by a predetermined frequency. The predetermined frequency is established based on a listener's hearing profile. For example, if the hearing profile showed high-frequency hearing loss, the voice signal would be shifted downwards by an amount great enough to move the part or all of the voice signal into the range where the listener has hearing ability. Step 810 shows that the relative frequency separation between the formants in the signal will be unchanged after the frequency shift of step 800. For example, if formant F1 occurred at twice the frequency of formant F2 in the unshifted signal, then F1 would occur at twice the frequency of F2 in the shifted signal.

Figure 9:
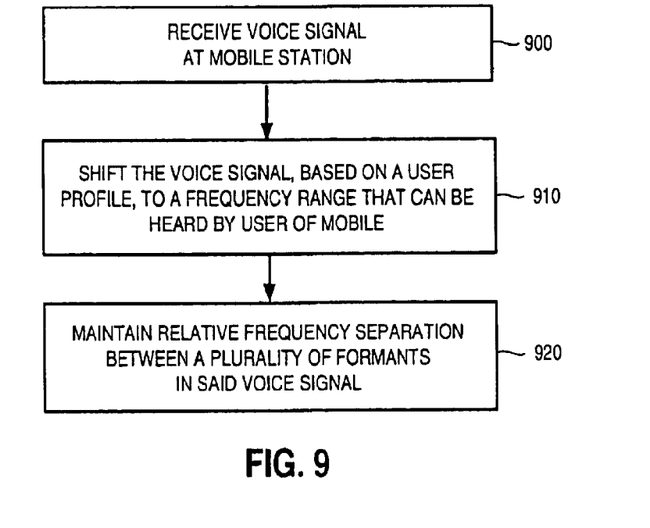
FIG. 9 depicts a block diagram of an alternative method of implementing an embodiment of the invention.

FIG. 9 depicts a block diagram of a method of implementing an embodiment of the disclosed invention in a mobile station. A voice signal is received at the mobile station in step 900. In step 910, the voice signal is shifted, based on a user profile, to a frequency range that can be heard by the mobile station user. The relative frequency separation between the formants of the voice signal is maintained, as shown in step 920. Proportionally, the relation between the formants of the shifted signal and the unshifted signal remains nearly the same.

Figure 10:
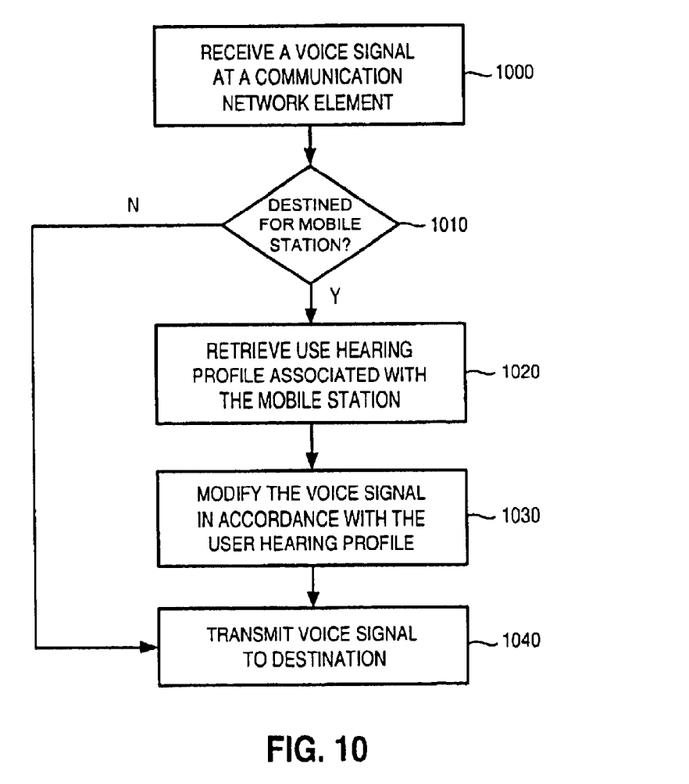
FIG. 10 depicts a block diagram of an alternative method of implementing an embodiment of the invention.

FIG. 10 depicts a block diagram of a method of implementing an embodiment of the disclosed invention in a communication system. In step 1000, a voice signal is received at an element in the communication network. At decision block 1010, if the voice signal is not destined for a mobile station, it can proceed to be transmitted to its destination in step 1040. At decision block 1010, if the voice signal is destined for a mobile station, a user hearing profile associated with the mobile station is retrieved by a network element in step 1020. After retrieving the hearing profile, the voice signal is modified in step 1030 in accordance with the profile. In step 1040, the modified signal is transmitted to its destination mobile station.

As will be recognized by those skilled in the art, the innovative concepts described in the present application can be modified and varied over a tremendous range of applications, and accordingly the scope of patented subject matter is not limited by any of the specific exemplary teachings given.

For example, although program storage of the innovative methods disclosed herein is discussed primarily in the context of flash memory, any suitable type of storage medium can be used, such as, perhaps, ROM, RAM, hard or floppy disk drives.

For example, although the apparatus and method have been described with reference to a mobile station, the innovative concepts disclosed are applicable to any portable communications device.

What is claimed is:

1. A method of operating a mobile communications system, comprising the steps of:
   receiving a voice signal at a communication network element, said voice signal destined for a mobile station;
   retrieving a plurality of user hearing profiles associated with said mobile station, wherein at least one of said user profiles is different than that of a user with normal hearing;
   presenting the user with a menu of the plurality of user profiles,
   permitting the user to select a profile from the plurality of profiles:
   modifying said voice signal in accordance with said the selected user hearing profile comprising the steps of:
      shifting said voice signal to a frequency range that can be more easily understood by said user, as indicated in said selected hearing profile;
      maintaining a relative frequency separation between a plurality of formats after said shifting step; and
   transmitting, in response to said modifying step, said voice signal to said mobile station.

2. The method of claim 1, wherein said communication network element is a mobile switching center.

3. The method of claim 1, wherein said communication network element is a base station.

4. The method of claim 1, wherein the user hearing profiles are stored in a network element.

5. A mobile station comprising:
   an antenna having an output;
   a speaker having an input;
   a memory for storing a plurality of user-adjustable hearing profiles different than that of a user with normal hearing;
   a display for displaying a menu of hearing profiles from which the user may select:
   a controller coupled between said output of said antenna and said input of said speaker, said controller configured to perform the steps of:
      receiving a voice signal; and
      shifting said voice signal by a predetermined frequency while maintaining the relative frequency separation between a plurality of voice-signal formants based on a selected user-adjustable hearing profile.

6. The mobile station of claim 5, wherein said adapting step comprises the steps of determining background noise frequency spectrum and shifting frequency of said voice signal in response to said determining background noise frequency spectrum step.

7. The mobile station of claim 6, wherein said determining background noise frequency spectrum step comprises the step of sampling background noise during periods of speech inactivity in said voice signal.

8. A mobile station for communicating with a communications network, said mobile station comprising:
   an antenna having an output;
   a speaking having an input;
   a keypad;
   a microphone;
   a memory for storing a plurality of user-adjustable hearing profile profiles different than that of a user with normal hearing;
   display for displaying a menu of hearing profiles from which the user may select;
   a controller coupled between said output of said antenna and said input of said speaker, said controller configured to perform the steps of shifting a voice signal by a predetermined frequency while maintaining a relative frequency separation between a plurality of voice-signal formants based on a selected user-adjustable hearing profile.

9. The mobile station of claim 8, further comprising the step of determining a hearing profile of a user of said mobile station.

10. The mobile station of claim 9, wherein said determining step comprises the step of administering a hearing test to said user using said mobile station.

11. The mobile station of claim 9, wherein said determining step comprises the step of receiving, via the mobile station's user interface, data defining said hearing profile.

12. The mobile station of claim 9, wherein said determining step comprises the step of downloading said hearing profile over the communication network.

13. A communications systems, comprising:
   a mobile station; and
   a communications network, said network comprising at least a base station and a mobile switching center;

wherein said communications network is configured to perform the steps of:

receiving a voice signal, said voice signal destined for a mobile station;

retrieving a plurality of user hearing profiles different than that of a user with normal hearing, the user being associated with said mobile station;

allowing the user to select one on the plurality of hearing profiles;

modifying said voice signal in accordance with the selected user hearing profile by shifting said voice signal by a predetermined frequency and maintaining, in response to said shifting step, a relative frequency separation between a plurality of formants in said voice signal; and transmitting said voice signal to said mobile station.

14. The communications system of claim 13, wherein said communications network is configured to perform the step of determining a hearing profile of said user.

15. The communications system of claim 14, wherein said determining step further comprises the step of administering a hearing test to said user via said mobile station.

16. The communications system of claim 14, wherein said determining step further comprises the step of receiving, via the mobile station's user interface, data defining said hearing profile.

17. The communications system of claim 14, wherein said determining step further comprises the step of downloading said hearing profile over the communications network.

18. The communications system of claim 13, wherein said communications network is configured to perform the step of storing in memory a hearing profile of said user.

19. A method of operating a mobile station, comprising the steps of:

maintaining in said mobile station a plurality of user-changeable user profiles different than that of a user with normal hearing;

permitting the user to select a profile from a menu of profiles;

receiving a voice signal at a mobile station;

shifting said voice signal, based on the selected user profile to a frequency range that can be heard by said user; and maintaining, in response to said shifting step, the relative frequency separation between a plurality of formats in said voice signal.

* * * * *